(12) United States Patent
Suganuma

(10) Patent No.: US 6,377,367 B1
(45) Date of Patent: Apr. 23, 2002

(54) METHOD OF RECORDING AND REPRODUCING HOLOGRAM AND APPARATUS FOR RECORDING AND REPRODUCING HOLOGRAM

(75) Inventor: Hiroshi Suganuma, Ibaraki (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/512,393

(22) Filed: Feb. 24, 2000

(30) Foreign Application Priority Data

Feb. 24, 1999 (JP) .......................................... 11-046940

(51) Int. Cl.⁷ ................................................. G03H 1/00

(52) U.S. Cl. ................. 359/1; 359/10; 359/11

(58) Field of Search ................. 359/1, 10, 11, 359/12; 430/1, 2; 283/86

(56) References Cited

U.S. PATENT DOCUMENTS 3,632,182 A * 1/1972 Sincerbox .................... 359/10

* cited by examiner

*Primary Examiner*—Cassandra Spyrou
*Assistant Examiner*—Leo Boutsikaris
(74) *Attorney, Agent, or Firm*—Sonnenschein, Nath & Rosenthal

(57) ABSTRACT

The first reading beam identical to the first reference beam and the second reading beam conjugate to the second reference beam are simultaneously applied to a hologram recording medium 1, on which holograms 2 and 3 have been recorded. A hologram is formed by interference between the first beam reproduced from the first reading beam and the second reading beam. Another hologram is formed by interference between the second beam reproduced from the second reading beam and the first reading beam. These holograms are recorded and superposed on the original holograms 2 and 3, thereby reproducing the original holograms 2 and 3.

10 Claims, 10 Drawing Sheets

METHOD OF RECORDING AND REPRODUCING HOLOGRAM AND APPARATUS FOR RECORDING AND REPRODUCING HOLOGRAM

BACKGROUND OF THE INVENTION

The present invention relates to a method and apparatus for recording data on and reproducing data from a hologram recording medium, by utilizing the interference between an object beam and a reference beam.

There has been hitherto proposed a hologram recording/reproducing system. In this system, an object beam modulated in accordance with data to be recorded is made to interfere with a reference beam in a hologram recording medium that acquires great photo-refractive effect. An interference pattern is thereby produced. The interference pattern is recorded as data on the hologram recording medium. A reading beam is applied to the recording medium on which data has been recorded, at the same angle of incidence as the reference beam, thereby reproducing the data from the hologram recording medium.

In the hologram recording/reproducing system, a light beam passes through a spatial light modulator such as a liquid crystal display (LCD) panel. As the light beam passes the modulator, it is modulated in accordance with the data representing the image that is displayed by the spatial light modulator. This light beam is applied, as object beam, into the hologram recording medium. The data representing the image is thereby recorded at once on the hologram recording medium. Data can be reproduced from the medium in units of holograms, each representing an image. Therefore, the data can be accessed at higher speed in this hologram recording/reproducing system than in the data recording/reproducing system which uses an optical disk as recording medium and which is known to achieve relatively high-speed data access.

In this hologram recording/reproducing system, the angle of incidence at which the reference beam is applied to the recording medium can be changed each time a hologram is recorded on the medium. If so, a number of holograms can be recorded, one overlapping another, on the recording medium, thus accomplishing so-called "multiple recording". The hologram recording/reproducing system can record data at an extremely high density.

Thus, the hologram recording/reproducing system attracts much attention as a system that satisfies the demands made as the information industry developed in recent years, i.e., the demand for an increase of recording density and the demand for an increase of data-accessing speed.

Generally, hologram recording media are made of photo-refractive crystals such as lithium niobate, which exhibits good optical property and which can form a sufficiently thick layer.

A hologram recording medium made of photo-refractive crystal is, however, disadvantageous. When the medium is exposed to light to reproduce data from the medium, the diffraction efficiency of the hologram recorded in the photo-refractive crystal decreases. As the hologram is repeatedly reproduced from the photo-refractive crystal, the refraction efficiency gradually lowers. Consequently, the S/N ratio of the data reproduced gradually decreases, until at last it becomes impossible to reproduce the hologram from the recording medium.

The diffraction efficiency $\eta_{writ}(t)$ that a hologram has immediately after it has been recorded in the photo-refractive crystal is given by the following equation (1):

$$\eta_{writ}(t) = \eta_0 \cdot (1 - e^{-\alpha/t}) \tag{1}$$

where $\alpha$ is the time constant at the time of recording the hologram, I is the spatial average intensity of light, t is the time that has elapsed from the recording the hologram, and $\eta_0$ is the saturated diffraction efficiency.

The diffraction efficiency $\eta_{read}(t)$ that a hologram has when it is reproduced from the photo-refractive crystal is given by the following equation(1):

$$\eta_{read}(t) = \eta_1 \cdot e^{-\alpha' t} \tag{2}$$

where $\alpha'$ is the time constant at the time of reproducing the hologram, I is the average intensity of light, and $\eta_1$ is the initial diffraction efficiency.

From the equations described above it is understood that the diffraction efficiency of each hologram recorded in the photo-refractive crystal exponentially decreases as the hologram is reproduced. (See P. Heh, *Photo-refractive Nonlinear Optics*, Maruzen, Tokyo).

As indicated above, the S/N ratio of the data reproduced decreases as the diffraction efficiency of the hologram lowers. If the S/N ratio much lowers at the time of reproducing the data, the signal component will be, so to speak, buried in the noise. This renders it impossible to reproduce the hologram. Thus, to maintain the diffraction efficiency at a value large enough to prolong the hologram, it is desired that some means be provided that would suppress the decrease in the diffraction efficiency, which takes place at the time of reproducing the hologram.

In order to lengthen the lifetime of a hologram, various attempts have been made hitherto. For example, an original hologram recorded in SBN crystal may be copied onto another recording medium made of thermoplastic or the like when the diffraction efficiency lowers as the hologram is reproduced. The hologram thus copied may then recorded again in the SBN crystal in which the original hologram has been recorded. (See D. Brady et al., Opt. Lett. 15,817 (1990).)

To lengthen the lifetime of the hologram by this method, the hologram copied must have higher diffraction efficiency than the original hologram. For this reason, the recording medium, which is used to copy the hologram, is made of thermoplastic, i.e., material exhibiting high diffraction efficiency. Thermoplastic has low resolution, however. A medium made of thermoplastic cannot reliably copy a hologram represented by a great amount of data. Using a plurality of hologram recording media, this method is inevitably complex. To make matters worse, the method requires much time to record and copy a hologram and is therefore not practical.

Another method has been proposed. In this method, a hologram reproduced is read by an imaging device such as a CCD. When the diffraction efficiency of the hologram falls below a threshold value, the image read by the imaging device such as a CCD is displayed by a spatial light modulator such as a liquid crystal display. The image thus displayed is recorded again, thereby refreshing the hologram. (See J. J. P. Drolet et al., Opt. Lett. 22. 552 (1997).)

A hologram recording/reproducing system employing this method has been proposed. In the system, the beam conjugate to the reference beam used to record a hologram is applied as a reading beam to reproduce the hologram. Aberration is thereby eliminated, making it possible to make the system compact. The term "conjugate beam" means a light beam that has the same wave front as the reference beam and propagates in the opposite direction.

In this method, however, the diffraction efficiency of the hologram must be compared with the threshold value and the system is complicated in structure. Furthermore, it is necessary to convert a light beam to an electric signal by the imaging device such as a CCD. Also is it necessary to convert the electric signal to a light beam by the spatial light modulator such as a liquid crystal display. Cause of errors, such as shot noise, inevitably increases.

To prevent a decrease in the diffraction efficiency of a hologram recorded in photo-refractive crystal, despite the light applied to the crystal to reproduce the hologram, it is proposed that two waves of different lengths be used to record a hologram. This method proposed has proved to be effective. (See U.S. Pat. No. 5,665,493 to Bai et al., Y. S. Bai and R. Kachru, Phys. Rev. Lett, 78, 2944, 1997.) In this method, crystals of Pr: $LiNbO_3$, Pr: $LiTaO_3$ and the like are used as the material of the recording medium. The method records a hologram in two steps. First, electrons at a low level are excited to an intermediate level, with blue light having a wavelength of about 450 nm. Second, infrared rays having a wavelength of about 850 nm are applied, thereby recording the hologram.

This method is, however, disadvantageous in some respects. First, two light sources are required. Second, the recording medium used has a lower sensitivity than one made of ordinary photo-refractive crystal. Further, the recording medium deteriorates over a long storage time, to the same extent as the conventional medium made of photo-refractive crystal.

BRIEF SUMMARY OF THE INVENTION

The present invention has been made in view of the foregoing. The object of the invention is to provide a method and apparatus for recording a hologram on and reproducing a hologram from a hologram recording medium. The method and apparatus are characterized in that the decrease in the diffraction efficiency of the hologram, which occurs as the hologram is reproduced from the medium, is effectively suppressed, thereby lengthening the lifetime of the hologram.

A hologram recording/reproducing method according to this invention comprises the steps of: providing a hologram recording medium on which a hologram has been recorded by interference between an object beam and a reference beam; simultaneously applying a beam identical to the reference beam and a beam conjugate to the reference beam, as reading beams, to the hologram recording medium; forming a hologram by interference between a beam reproduced from the beam identical to the reference beam and the beam conjugate to the reference beam; forming a hologram by interference between a beam reproduced from the beam conjugate to the reference beam and the beam identical to the reference beam; and recording the holograms on the hologram recording medium, superposed one on the other, thereby reproducing the hologram.

In the hologram recording/reproducing method, the beam identical to the reference beam applied to record the hologram and the beam conjugate to the reference beam are simultaneously applied, as reading beams, to the hologram recording medium. As a result, the beam reproduced from the beam identical to the reference beam interferes with the beam conjugate to the reference beam, and the beam reproduced from the beam conjugate to the reference beam interferes with the beam identical to the reference beam.

The beam conjugate to the reference beam has the same wave front as the reference beam and propagates in the opposite direction to the reference beam. Hence, the hologram formed by interference between the beam reproduced from the beam identical to the reference beam and the beam conjugate to the reference beam, and the hologram formed by interference between the beam reproduced from the beam conjugate to the reference beam and the beam identical to the reference beam are identical to the original program formed on the hologram recording medium.

Therefore, with the hologram recording/reproducing method it is possible to record a new hologram identical to the original hologram on the hologram recording medium, while reproducing the original hologram. This helps suppress the decrease in the diffraction efficiency that occurs when the hologram is reproduced.

A hologram recording/reproducing apparatus according to the invention comprises: a recording medium holding section for holding a hologram recording medium on which a hologram has been recorded by interference between an object beam and a reference beam; and a hologram recording/reproducing section for simultaneously applying a beam identical to the reference beam and a beam conjugate to the reference beam, as reading beams, to the hologram recording medium, forming a hologram by interference between a beam reproduced from the beam identical to the reference beam and the beam conjugate to the reference beam, forming a hologram by interference between a beam reproduced from the beam conjugate to the reference beam and the beam identical to the reference beam; and recording the holograms on the hologram recording medium, superposed one on the other, thereby reproducing the hologram.

In the hologram recording/reproducing apparatus, the recording medium holding section holds the hologram recording medium on which a hologram has been recorded. The hologram recording/reproducing section simultaneously applies a beam identical to the reference beam and a beam conjugate to the reference beam, as reading beams, to the hologram recording medium. As a result, the beam reproduced from the beam identical to the reference beam and the beam reproduced from the beam conjugate to the reference beam interfere with each other, and the beam reproduced from the beam conjugate to the reference beam and the beam identical to the reference beam interfere with each other.

The beam conjugate to the reference beam has the same wave front as the reference beam and propagates in the opposite direction to the reference beam. Hence, the hologram formed by interference between the beam reproduced from the beam identical to the reference beam and the beam conjugate to the reference beam, and the hologram formed by interference between the beam reproduced from the beam conjugate to the reference beam and the beam identical to the reference beam are identical to the original program formed on the hologram recording medium.

Therefore, with the hologram recording/reproducing apparatus it is possible to record a new hologram identical to the original hologram on the hologram recording medium, while reproducing the original hologram. This helps suppress the decrease in the diffraction efficiency that occurs when the hologram is reproduced.

In the hologram recording/reproducing method according to this invention, a beam identical to the reference beam and a beam conjugate to the reference beam are simultaneously applied, as reading beams, to a hologram recording medium on which a hologram has been recorded. A hologram is formed by interference between a beam reproduced from the beam identical to the reference beam and the beam conjugate to the reference beam. Further, another hologram is formed by interference between a beam reproduced from the beam conjugate to the reference beam and the beam identical to the reference beam. The holograms on the hologram recording medium is recorded and superposed one on the other, thereby reproducing the hologram. Therefore, the decrease in the diffraction efficiency of the hologram can be suppressed, thus lengthening the lifetime of the hologram.

In the hologram recording/reproducing apparatus according to the invention, the hologram recording/reproducing section simultaneously applies a beam identical to the reference beam and a beam conjugate to the reference beam, as reading beams, to the a hologram recording medium which is held by the recording medium holding means and on which a hologram has been recorded. A hologram is formed by interference between a beam reproduced from the beam identical to the reference beam and the beam conjugate to the reference beam. Another hologram is formed by interference between a beam reproduced from the beam conjugate to the reference beam and the beam identical to the reference beam. These holograms are recorded on the hologram recording medium and superposed one on the other, thereby reproducing the hologram. Hence, the decrease in the diffraction efficiency of the hologram can be suppressed, thus lengthening the lifetime of the hologram.

DETAILED DESCRIPTION OF THE INVENTION

Embodiments of the present invention will be described with reference to the accompanying drawings.

First, the principle of an hologram recording/reproducing method according to this invention will be described, with reference to FIGS. 1 to 11.

Figure 1:
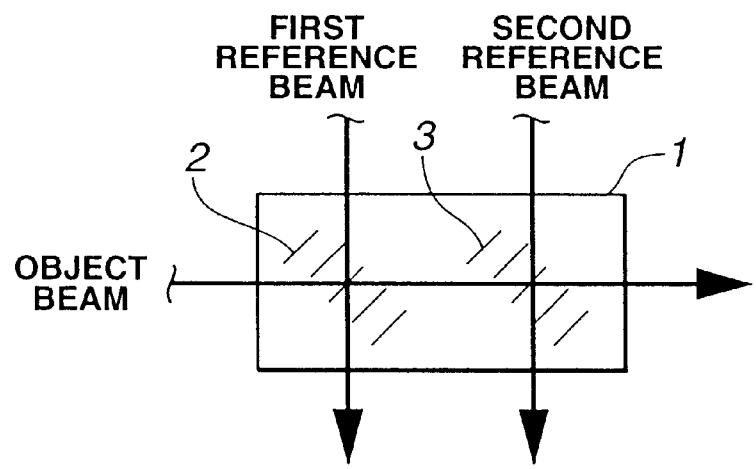
FIG. 1 is a diagram illustrating a method of recording a hologram on a hologram recording medium by applying two reference beams that propagate in the same direction.
Figure 2:
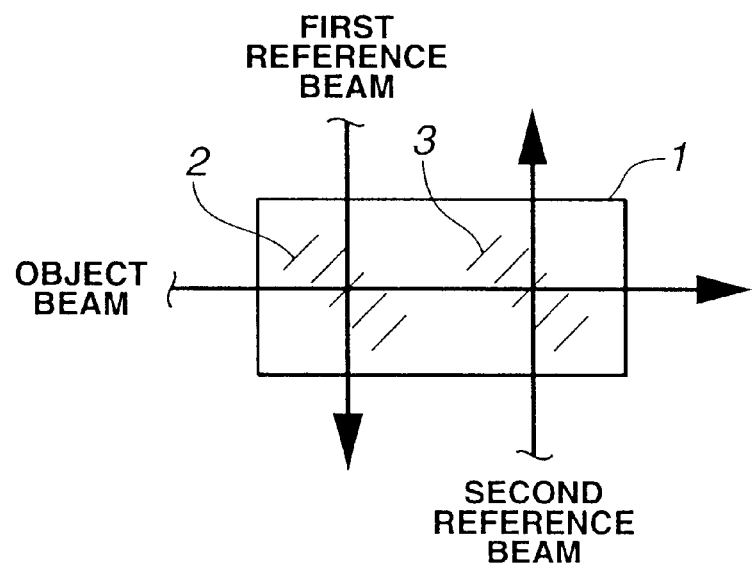
FIG. 2 is a diagram depicting a method of recording a hologram on a hologram recording medium by applying two reference beams that propagate in the opposite directions.

FIGS. 1 and 2 show a method of recording a hologram on a hologram recording medium 1. An object beam, i.e., a light beam modulated in accordance with the data to be recorded, is applied to the hologram recording medium 1. Two reference beams having the same wave front are also applied to the hologram recording medium 1. The first and second reference beams are either coherent or coherent enough to provide an interference pattern that has a sufficient contrast. The first and second reference beams may be plane waves or spherical waves.

When the object beam and the first and second reference beams are applied to the hologram recording medium 1, the object beam interferes with the first reference beam, forming an interference pattern. The interference pattern is recorded as a first hologram 2 on the hologram recording medium 1. Meanwhile, the object beam interferes with the second reference beam, forming an interference pattern. This interference pattern is recorded as a second hologram 3 on the hologram recording medium 1. The first reference beam and the second reference beam have the same wave front. Therefore, the first hologram 2 formed of the object beam and first reference beam and the second hologram 3 formed of the object beam and second reference beam are identical.

The first reference beam and the second reference beam may be two light beams which are spatially separated. Alternatively, they may be parts of one light beam. If the first and second reference beams are light beams spatially separated, they may propagate in the same direction as shown in FIG. 1 or in the opposite directions as shown in FIG. 2.

The first and second reference beams may overlap in the hologram recording medium 1. Alternatively, they may be regarded as a sum of two light beams, i.e., a single light beam. In the latter case, a single hologram is considered, for practical purpose, to be two holograms that are recorded on the hologram recording medium 1.

In FIGS. 1 and 2, the first reference beam and the second reference beam are those which are spatially separated. The first reference beam is applied to that part of the medium 1 to which the object light is applied. The second reference beam is applied to that part of the medium 1 from which the object light comes out.

Two reference beams are used in the present embodiment. Nonetheless, the hologram reproducing method according to the invention is not limited to this embodiment. Rather, three or more reference beams may be used in the present invention.

FIGS. 1 and 2 show methods in which an object beam and reference beams are applied to the adjoining faces of a rectangular hologram recording medium and the object beam intersects at right angles to the reference beams in the hologram recording medium. In these methods, the selectivity of Black's angle is the highest to accomplish angle multiplexing. In view of this, the methods are desirable for recording many holograms. The shape of the hologram recording medium and the angles of incidence of the reference beams are not limited to those selected in the methods shown in FIGS. 1 to 4.

Figure 3:
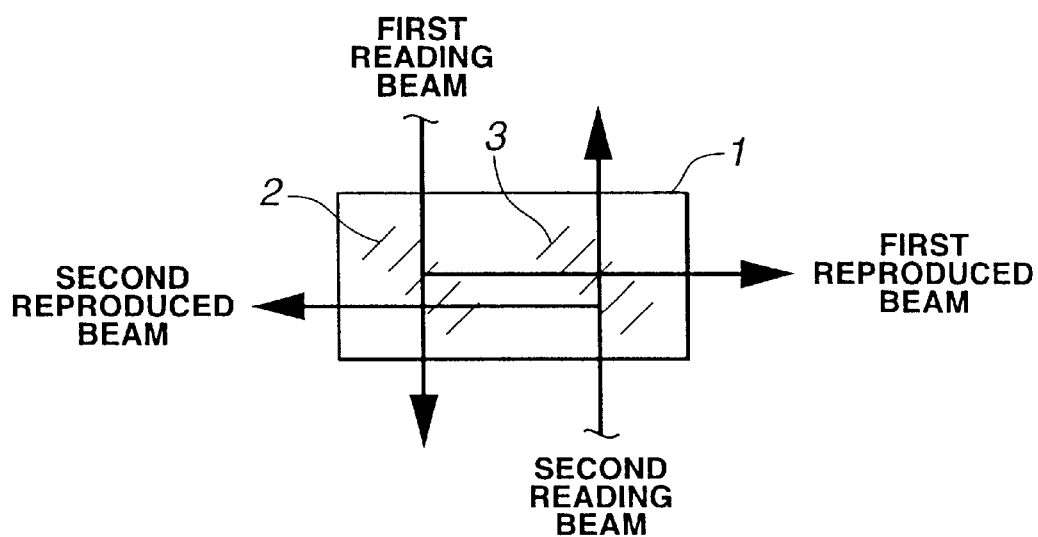
FIG. 3 is a diagram showing a hologram recording/reproducing method according to this invention, in which a hologram is reproduced from a hologram recording medium by applying two reference beams that propagate in the same direction.
Figure 4:
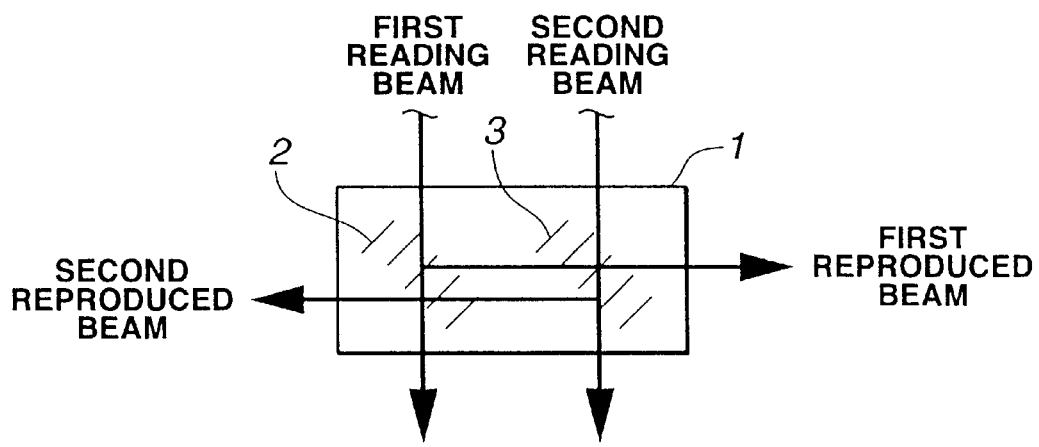
FIG. 4 is a diagram showing a hologram recording/reproducing method according to this invention, in which a hologram is reproduced from a hologram recording medium by applying two reference beams that propagate in the opposite directions.

With reference to FIGS. 3 and 4, it will be described how the first hologram 2 and the second hologram 3, both recorded on the hologram recording medium 1, are reproduced by the hologram recording/reproducing method according to this invention. Two reading beams are applied to the hologram recording medium 1 at the same time. The first reading beam is identical to the first reference beam that has been applied to record the hologram, whereby the first hologram 2 is reproduced and a first beam is reproduced. The second reading beam is conjugate to the second reference beam that has been applied to record the hologram, whereby the second hologram 3 is reproduced and a second beam is reproduced.

As mentioned above, the second reading beam is conjugate to the second reference beam. Hence, the second beam generated by reproducing the second hologram propagates in the opposite direction to the first beam generated by reproducing the first hologram. That is, the first reproduced beam and the second reproduced beam conjugate to the first beam are simultaneously generated by applying the first and second reading beams at the same time to the recording medium 1 on which the first and second holograms have been recorded.

The first light beam reproduced from the first reading beam interferes with the second reading beam at the position where the second hologram 3 has been recorded on the hologram recording medium 1. As the first light beam, which has been reproduced, interferes with the second reading beam, a new hologram is superposed on the second hologram 3. The first hologram 2 and the second hologram 3 are identical as has been indicated above. Thus, a hologram identical to the second hologram in principle is superposed on the second hologram 3.

In the meantime, the second light beam reproduced from the second reading beam interferes with the first reading beam at the position where the first hologram 2 has been recorded on the hologram recording medium 1. As the first light beam, which has been reproduced, interferes with the first reading beam, a new hologram is superposed on the first hologram 2. The first hologram 2 and the second hologram 3 are identical as has been described above. Hence, a hologram identical to the first hologram in principle is superposed on the first hologram 2.

FIG. 3 shows how the holograms 2 and 3 are reproduced from the hologram recording medium 1 on which both holograms have been recorded, in a hologram recording/reproducing method of the invention, in which two reference beams propagating in the same direction (as is shown in FIG. 1) are applied to the hologram recording medium 1. FIG. 4 illustrates how the holograms 2 and 3 are reproduced from the hologram recording medium 1 on which both holograms have been recorded, in a hologram recording/reproducing method of the invention, in which two reference beams propagating in the opposite directions (as shown in FIG. 2) are applied to the hologram recording medium 1.

Every time the first and second holograms 2 and 3 are reproduced from the hologram recording medium 1 in the hologram recording/reproducing method of the present invention, two holograms identical to the first and second holograms 2 and 3 are superposed on the first and second holograms 2 and 3. It is therefore possible to suppress the decrease in the diffraction efficiency, which occurs as the holograms 2 and 3 are reproduced. This helps to lengthen the lifetime of each hologram.

The increase of diffraction efficiency, attained by superimposing new holograms on the first and second holograms 2 and 3, respectively, may exceed the decrease of diffraction efficiency, which accompanies the reproduction of the first and second holograms 2 and 3. If this is the case, the diffraction efficiency can be enhanced every time the first and second holograms 2 and 3 are reproduced.

Figure 5:
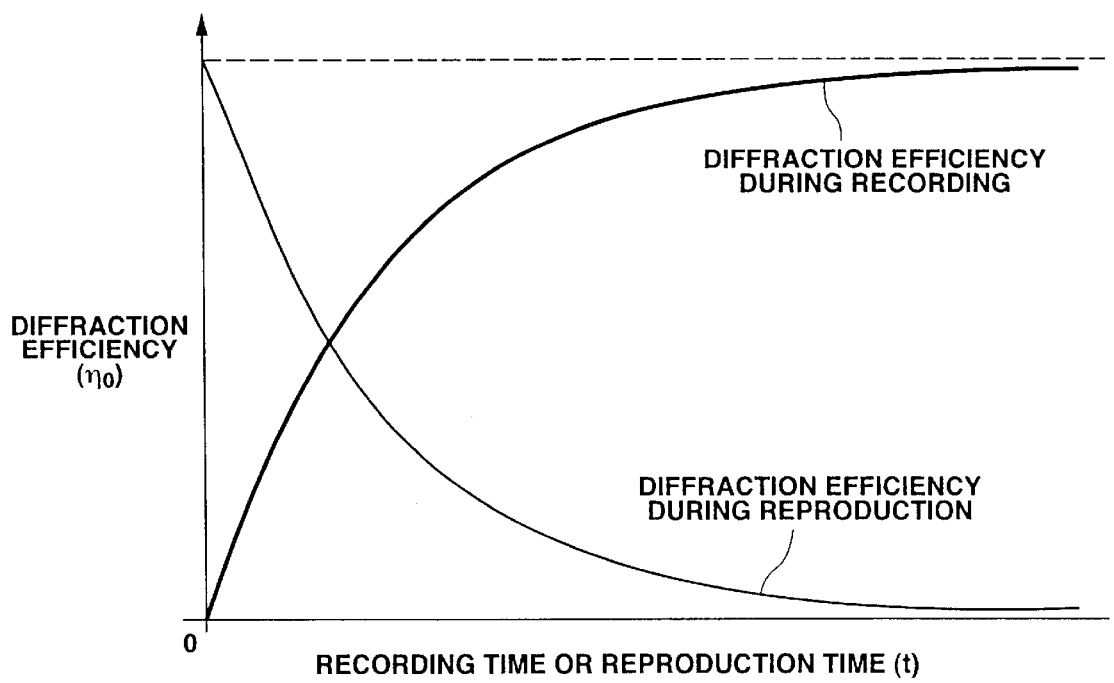
FIG. 5 is a graph illustrating how the diffraction efficiency changes as a hologram is recorded and reproduced.

FIG. 5 illustrates how the diffraction efficiency changes as a hologram is recorded and reproduced. In the figure, the diffraction efficiency is plotted on the ordinate, while the recording time and reproducing time are plotted on the abscissa. As seen from FIG. 5, the diffraction efficiency more increases as the hologram is recorded than it decreases as the hologram is reproduced, so long as the diffraction efficiency of the hologram is sufficiently low.

In the hologram recording/reproducing method of this invention, a new hologram is recorded and superposed on the hologram being reproduced. The time required to reproduce the hologram is therefore considered to be equal to the time required to superpose the new hologram on that hologram. Hence, the diffraction efficiency of the hologram can be enhanced every time the hologram is reproduced, provided that the diffraction efficiency is sufficiently low while the hologram is being reproduced in the hologram recording/reproducing method of the present invention.

Conversely, if the diffraction efficiency of the hologram is sufficiently high, the diffraction efficiency more decreases as the hologram is reproduced than it increases as the hologram is recorded. Thus, the diffraction efficiency of the hologram gradually decreases every time the hologram is reproduced, provided that the diffraction efficiency is sufficiently high while the hologram is being reproduced in the hologram recording/reproducing method of the invention. In this case, too, the rate at which the diffraction efficiency decreases can be more reduced than in the case where hologram is reproduced by the ordinary hologram reproducing method.

In the embodiment described above, an object beam and two reference beams are applied to one hologram recording medium 1, recording the first hologram 2 and the second hologram 3 on the hologram recording medium 1. Two reading beams are simultaneously applied to the hologram recording medium, thereby reproducing the first hologram 2 and the second hologram 3 from the medium 1, while superimposing the holograms 2 and 3 on each other. The hologram recording/reproducing method of the invention is not limited to that embodiment, nonetheless. Rather, a plurality of hologram recording media may be used.

It is more advantageous to use one hologram recording medium 1. If two or more hologram recording media are used, they may be displaced with respect to one another due to mechanical vibrations, and it is therefore necessary to adjust the positions of the media. The essence of the hologram recording/reproducing method of this invention resides in that the first reading beam identical to a reference beam and the second reading beam conjugate to the reference beam are applied to a hologram-recorded medium at the same time, thereby reproducing the hologram from the medium. Therefore, two reading beams may be independently applied to a plurality of hologram recording media on which the same hologram is recorded.

In this case, the hologram recording media must be made of different materials, depending upon their respectively uses. One medium may be made of material that exhibits high diffraction efficiency. Another medium may be made of material that prolongs the lifetime of the media, still another may be made of material that helps enhance the recording speed, and so forth. These media are used in combination, each compensating for the defective property of any other. The use of these hologram recording media can serve to construct an optimal hologram recording/reproducing system.

A hologram recording/reproducing method, wherein a plurality of hologram recording media, more precisely two hologram recording media 1 land 12, are used, will be described with reference to FIGS. 6 and 7.

Figure 6:
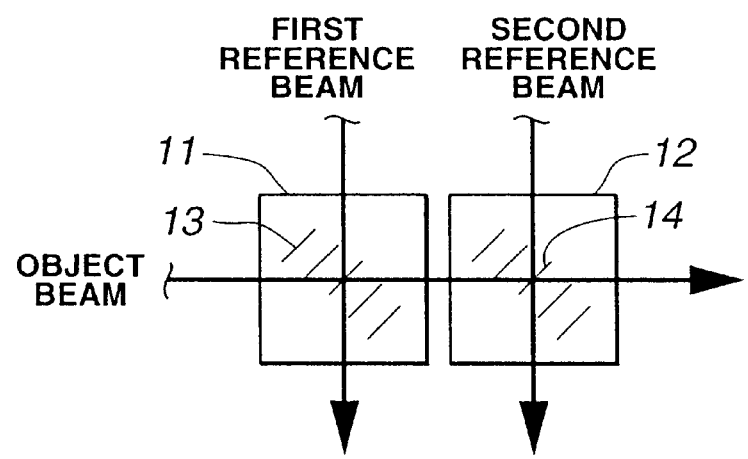
FIG. 6 is a diagram showing how a hologram is recorded on two hologram recording media.

To record holograms, an object beam modulated in accordance with the data to be recorded is applied to the first and second hologram recording media 11 and 12, as is illustrated in FIG. 6. More specifically, the object beam is applied first to the first hologram recording medium 11 and passes through the medium 11. The object beam is then applied to the second hologram recording medium 12 that is placed at the back of the first hologram recording medium 11.

Further, the first reference beam is applied to the first hologram recording medium 11. The second reference beam having the same wave front as the first reference beam is applied to the second hologram recording medium 12.

The object beam and the first reference beam, both applied to the first hologram recording medium 11, interfere with each other in the first hologram recording media 11. The interference results in an interference pattern. The interference pattern is recorded as the first hologram 13 on the first hologram recording medium 11. Meanwhile, the object beam and the second reference beam, both applied to the second hologram recording medium 12, interfere with each other in the second hologram recording media 12. This interference results in an interference pattern, which is recorded as the second hologram 14 on the second hologram recording medium 12.

Figure 7:
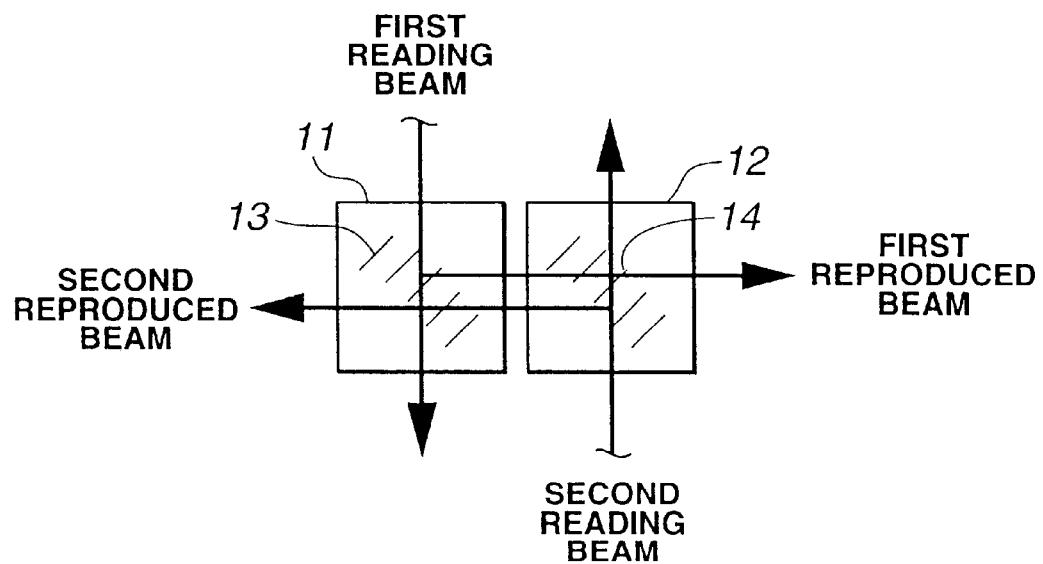
FIG. 7 is a diagram illustrating how a hologram is reproduced from two hologram recording media by a hologram recording/reproducing method according to the present invention.

To reproduce the holograms, the first reading beam identical to the first reference beam is applied, as shown in FIG. 7, to the first hologram recording medium 11 on which the first hologram 13 has been recorded. As the first reading beam is applied to the medium 11, the first hologram 13 is reproduced, generating a first reproduced beam.

Similarly, the second reading beam conjugate to the second reference beam is applied to the second hologram recording medium 12 on which the second hologram 14 has been recorded. As the second reading beam is applied to the medium 12, the second hologram 14 is reproduced, generating a second reproduced beam.

As mentioned above, the second reading beam is conjugate to the second reference beam. Therefore, the second reproduced beam generated by reproducing the second hologram 14 propagates in the direction opposite to that direction in which the first beam generated by reproducing the first hologram 13. That is, when the first reproduced beam and second reading beams are applied respectively to the first and second hologram recording media 11 and 12 on which the first and second holograms are recorded, the first reproduced beam and the second reproduced beam conjugate to the first reproduced beam are generated at the same time.

The first beam reproduced from the first reading beam is emitted from the first hologram recording medium 11 and applied to the second hologram recording medium 12. In the second hologram recording medium 12, the first reproduced beam interferes with the second reading beam at a position where the second hologram 14 has been recorded. As the first reproduced beam interferes with the second reading beam, a new hologram is superposed on the second hologram 14 and is thereby recorded on the second hologram recording medium 12. Since the first hologram 13 and the second hologram 14 are identical, a hologram identical in principle to the second hologram 14 is superposed on the second hologram 14.

The second reproduced beam generated from the second reading beam is emitted from the second hologram recording medium 12 and applied to the first hologram recording medium 11. In the first hologram recording medium 11, the second reproduced beam interferes with the first reading beam at a position where the first hologram 13 has been recorded. As the second reproduced beam interferes with the first reading beam, a new hologram is superposed on the first hologram 13 and is thereby recorded on the first hologram recording medium 11. Since the first hologram 13 and the second hologram 14 are identical, a hologram identical in principle to the first hologram 13 is superposed on the first hologram 13.

If two hologram recording media are used as in the above embodiment, one of the media serves to record an original master hologram, while the other medium serves to record a copy of the master hologram. A hologram may be reproduced from the copy hologram as in most cases, thus preventing deterioration of the master hologram. Alternatively, a hologram may be reproduced from both the master hologram and the copy hologram, thereby to prevent the diffraction efficiency from decreasing. A hologram can be reproduced in whichever manner, in the hologram recording/reproducing method according to the present invention.

Figure 8:
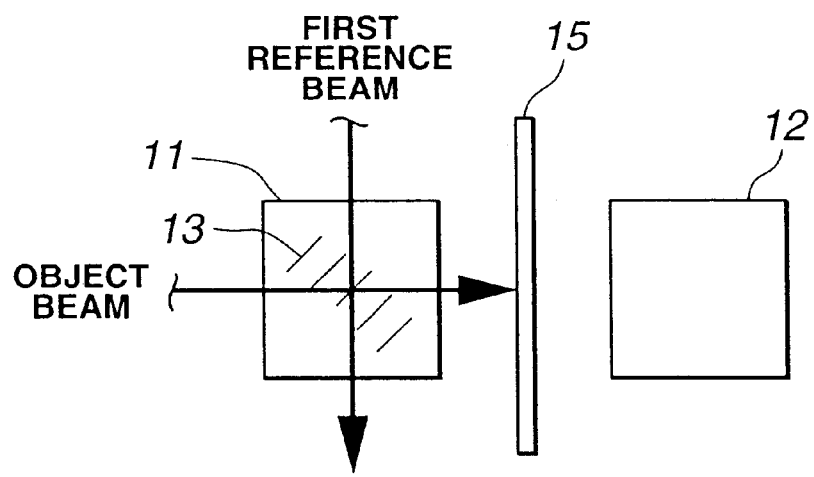
FIG. 8 is a diagram explaining how an original master hologram is recorded.

How the master hologram is generated will be explained with reference to FIG. 8. First, a shutter 15 is arranged between the first hologram recording medium 11 and the second hologram recording medium 12. Next, the object beam and the first reference beam are applied to the first hologram recording medium 11. The object beam and the first reference beam interfere with each other in the first hologram recording medium 11. As a result, the first hologram 13, which serves as master hologram, is recorded on the first recording medium 11. At this time, the shutter 15 blocks the object beam that has transmitted through the first hologram recording medium 11. Thus, the object beam would not propagate into the second hologram recording medium 12.

Figure 9:
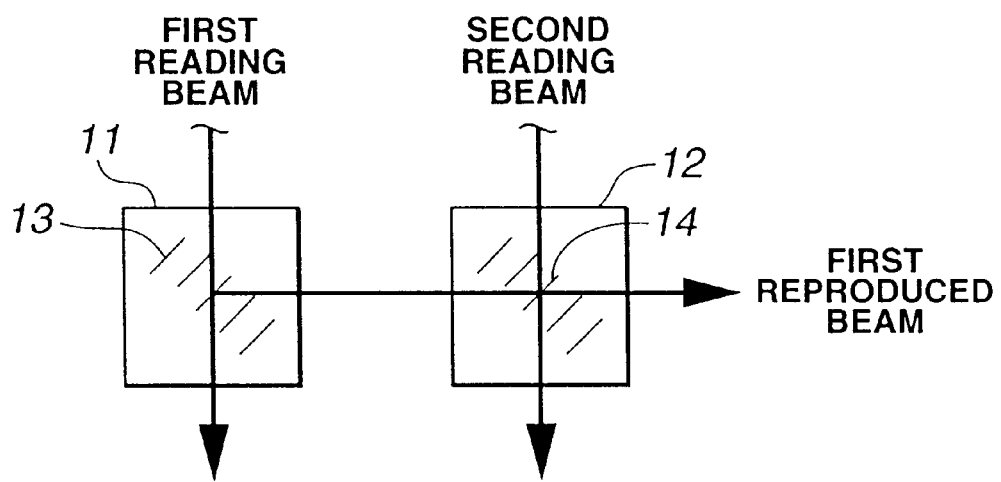
FIG. 9 is a diagram depicting how a copy hologram is formed by using a master hologram.

How the copy hologram is generated will be explained with reference to FIG. 9. First, the shutter 15 interposed between the first hologram recording medium 11 and the second hologram recording medium 12 is opened. The first reading beam is therefore applied to the first hologram recording medium 11. The first hologram is thereby reproduced, and the first reproduced beam is generated. The first reproduced beam propagates into the second hologram recording medium 12, because the shutter 15 provided between the hologram recording media 11 and 12 remains open.

Thereafter, the second reference beam is applied to the second hologram recording medium 12. In the second hologram recording medium 12, the second reference beam interferes with the first reproduced beam. The second hologram 14, i.e., the copy hologram, is thereby recorded on the second hologram recording medium 12.

Figure 10:
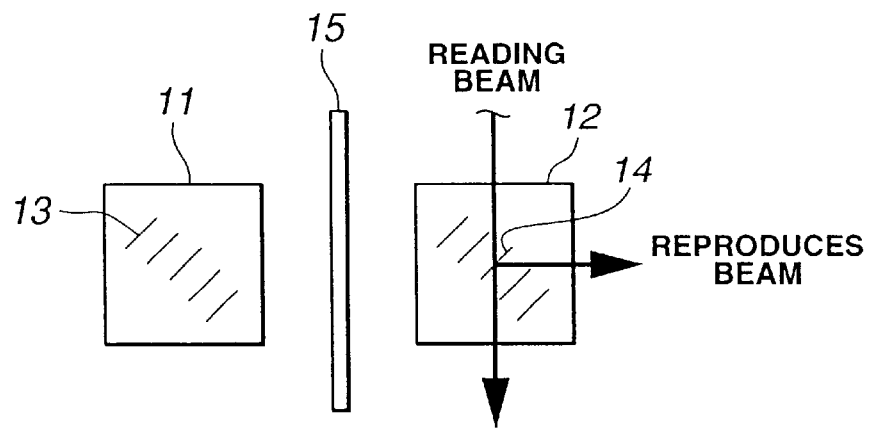
FIG. 10 is a diagram showing how a copy hologram is reproduced.

To reproduce the copy hologram, the shutter 15 is interposed between the first hologram recording medium 11 and the second hologram recording medium 12 as is illustrated in FIG. 10. Then, a reading beam identical to the second reference beam is applied to the second hologram recording medium 12. The second hologram is thereby reproduced, generating a light beam.

Figure 11:
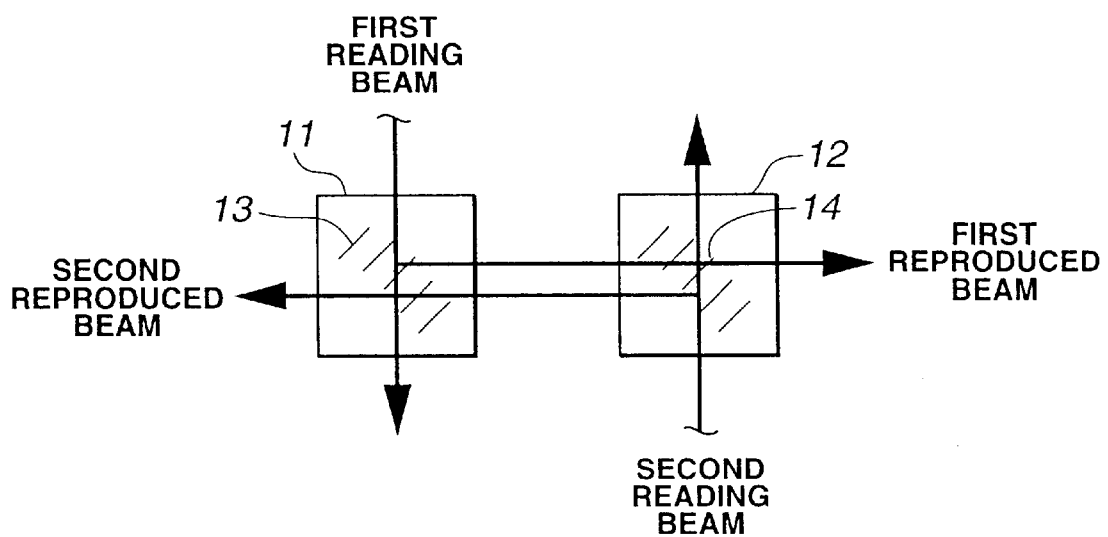
FIG. 11 is a diagram explaining how a hologram is reproduced by using a master hologram a copy hologram by a hologram recording/reproducing method according to the invention.

To reproduce a hologram by the hologram recording/reproducing method of this invention, the first reading beam identical to the first reference beam is applied to the first hologram recording medium 11 as is illustrated in FIG. 11. The first hologram 13 is thereby reproduced. The second hologram 14 is superposed and recorded, thereby reproducing the first beam. Further, the second reading beam conjugate to the second reference beam is applied to the second hologram recording medium 12, thereby reproducing the second hologram. The first hologram 13 is superposed and recorded, thereby reproducing the second beam.

Figure 12:
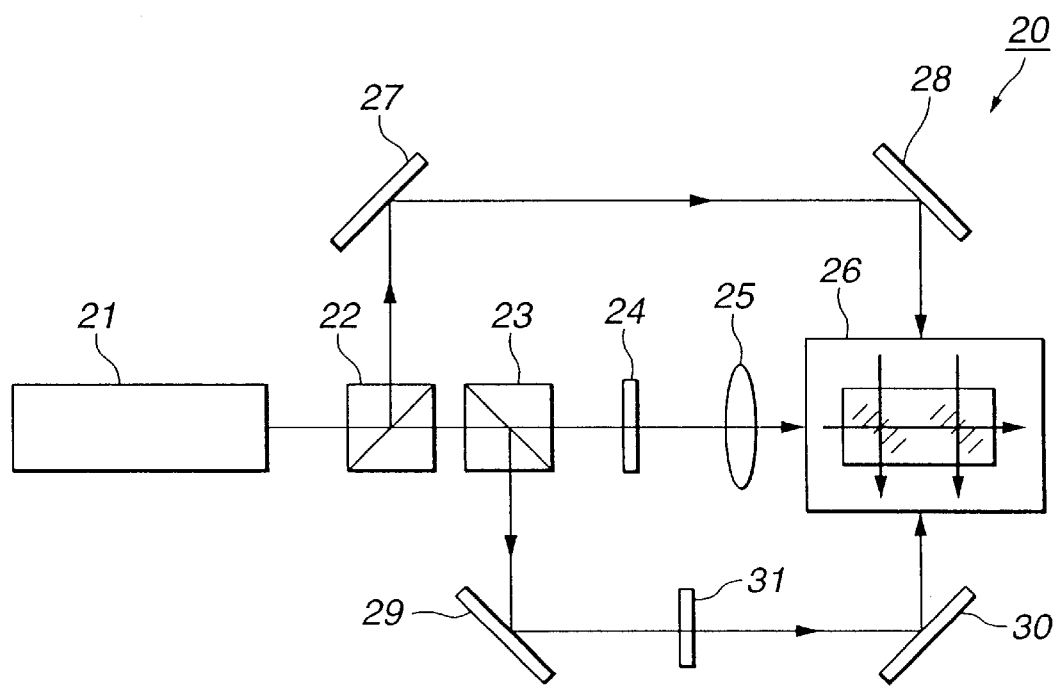
FIG. 12 is a hologram recording/reproducing apparatus according to the invention, for explaining how a hologram is recorded on a hologram recording medium.

A hologram recording/reproducing apparatus 20 according to this invention will be described, with reference to FIG. 12. In FIG. 12, the collimator lens for converting a laser beam emitted from the light source, into a parallel light beam, the beam expander for changing the diameter of the laser beam to an appropriate value, the relay lenses and the like are not shown. These optical elements may be arranged at positioned desired in accordance with the design. The apparatus 20 will be described on the assumption that the laser beam emitted from the light source has a sufficient diameter and a parallel beam. It is further assumed that the components of the apparatus are arranged so that the paths of the object beam, first reference beam and second reference beam are of the same length.

It will be explained how a hologram is recorded on a hologram recording medium 1 by this hologram recording/reproducing apparatus 20, with reference to FIG. 12.

In order to record a hologram on the hologram recording medium 1 by the apparatus 20, the light source 21 emits a laser beam that has a sufficiently short wavelength and high coherence. The laser beam emitted from the light source 21 is reflected in part by a first beam splitter 22. The other part of the laser beam passes through the first beam splitter 22. Thus, the laser beam is split into two beams, which propagate through two light paths.

The laser beam that has passed through the first beam splitter 22 is reflected in part by a second beam splitter 23 provided on the light path of the laser beam. The other part of the laser beam passes through the second beam splitter 23. Thus, the laser beam is split into two beams, which propagate through two light paths.

The laser beam that has passed through the second beam splitter 23 is modulated by a spatial light modulator 24 that is, for example, an LCD that has been provided on the light path of the laser beam. The laser beam modulated by the modulator 24 is applied as the object beam, via Fourier transform lens 25, to the hologram recording medium 1 that is held by a medium holding means 26.

In the meantime, the laser beam reflected by the first beam splitter 22 is reflected by two mirrors 27 and 28, both provided on the light path of the laser beam. The laser beam, thus reflected twice, is applied as first and second reference beams to the hologram recording medium 1 held by the medium holding means 26. The laser beam reflected by the second beam splitter 23 is first reflected by a mirror 29 and then blocked by a shutter 32. The first reference beam and the second reference beam are spatial parts of a single beam applied to the hologram recording medium 1. The first reference beam is applied to that portion of the medium 1 to which the object beam is applied. On the other hand, the second reference beam is applied to that portion of the medium 1 from which the object beam is emitted.

In the hologram recording medium 1, the object beam interferes with the first reference beam, whereby a first hologram 2 is recorded on the hologram recording medium 1. The object beam also interferes with the second reference beam, whereby a second hologram 3 is recorded on the hologram recording medium 1. It should be noted that the second hologram 3 is identical to the first hologram 2. In FIG. 12, the first and second reference beams are depicted as two light beams spatially separated from each other, for the sake of simplicity of explanation. Furthermore, the first hologram 2 and the second hologram 3 are illustrated as ones to be recorded at positions spatially remote from each other, also for simplicity of explanation.

How to reproduce the hologram recorded on the hologram recording medium 1 by the hologram recording/reproducing apparatus 20 will be described, with reference to FIG. 13.

To reproduce the hologram from the hologram recording medium 1 by the hologram recording/reproducing apparatus 20, the light source 21 emits a laser beam as it did to record the hologram on the medium 1. The laser beam emitted from the light source 21 is reflected in part by the first beam splitter 22 arranged on the path of this laser beam. The remaining part of the laser beam passes through the first beam splitter 22. Thus, the laser beam is split into two beams, which propagate through two light paths.

The laser beam that has passed through the first beam splitter 22 is reflected in part by the second beam splitter 23 arranged on the light path of the laser beam. The other part of this laser beam passes through the second beam splitter 23. The laser beam is, therefore, split into two beams. These beams propagate through two light paths.

The laser beam reflected by the first beam splitter 22 is reflected by a mirror 27. The shutter 32 blocks the laser beam thus reflected. More specifically, the shutter 32 blocks that part of the laser beam which corresponds to the second reference beam, i.e., that part of the laser beam which will be finally applied to that portion of the medium 1 from which the object beam is emitted.

That part of the laser beam reflected by the mirror 7, which the shutter 32 does not block, i.e., that part of the laser beam which corresponds to the first reference beam, is reflected by a mirror 28. This part of the laser beam is applied as the first reading beam to the hologram recording medium 1 held by the medium holding means 26. As has been described, the first reading beam is identical to the first reference beam.

Meanwhile, the laser beam reflected by the second beam splitter 23 is reflected by the mirror 29. Part of the laser beam is blocked by a shutter 31. More precisely, the shutter 31 blocks that part of the laser beam reflected by the mirror 29, which will be finally applied to that portion of the medium 1 to which the object beam is applied.

That part of the laser beam reflected by the mirror 29, which the shutter 31 does not block, is reflected by a mirror 30 and applied as the second reading beam to the hologram recording medium 1 held by the medium holding means 26. The second reading beam has the same wave front as the second reference beam. It is conjugate to the second reference beam that propagates in the opposite direction.

The laser beam, which has passed through the second beam splitter 23, is blocked by a shutter 33.

When the first reading beam and the second reading beam are applied to the hologram recording medium 1, the first hologram is reproduced from the first reading beam and the first beam is reproduced. Further, the second hologram is reproduced from the second reading beam and the second beam is reproduced.

In the hologram recording medium 1, the first reproduced beam interferes with the second reading beam at the position where the second hologram 3 has been recorded. A new hologram is thereby generated and superposed on the second hologram 3. As mentioned above, the first hologram 2 and the second hologram 3 are identical to each other. Thus, a hologram identical, in principle, to the second hologram 3 is superposed on the second hologram 3. The first reproduced beam is emitted from that portion of the medium 1 from which the object beam is emitted. The first reproduced beam passes through a Fourier transform lens 34 and is thereby subjected to Fourier transform. Finally, the first reproduced beam is applied to an imaging device 35 such as a CCD.

In the hologram recording medium 1, the second reproduced beam interferes with the first reading beam at the position where the first hologram 2 has been recorded. A new hologram is thereby recorded and superposed on the first hologram 2. As pointed out above, the first hologram 2 and the second hologram 3 are identical to each other. Therefore, a hologram identical, in principle, to the first hologram 2 is superposed on the first hologram 2. The second produced beam is emitted from that portion of the medium I to which the object light is applied. The second produced beam passes through the Fourier transform lens 25 and is thereby subjected to Fourier transform. The second reproduced beam is then reflected by a mirror 36 and applied to an imaging device 37 such as a CCD.

As has been explained, every time the first hologram 2 and the second hologram 3 are reproduced in the hologram recording/reproducing apparatus 20 of the invention, two holograms identical to the holograms 2 and 3, respectively, are recorded and superposed on these holograms 2 and 3. Hence, the decrease in diffraction efficiency, which takes place when the holograms are reproduced, can be suppressed, making it possible to lengthen the lifetime of each hologram.

In the hologram recording/reproducing apparatus 20 according to the present invention, the light source 21 may be a narrow-band semiconductor laser such as a DFB or a DBR, a solid-state laser such as a YAG laser, a gas laser such as an argon ion laser, or a high-coherent, narrow wavelength range laser such as a higher harmonic type of any one of these lasers.

In the embodiment described above, the spatial light modulator 24 is a transmission type such as an LCD. Nonetheless, the modulator 24 may be a reflection-type spatial light modulator, not a transmission type. In recent years particularly, various spatial light modulators have been developed, each designed to control the miniature mirror array formed on a silicon substrate or the like by means of microstructure process. Any one of these spatial light modulators can be used as the modulator 24 in the hologram recording/reproducing apparatus 20 according to the invention.

The hologram medium 1, on and from which a hologram is recorded and reproduced by the hologram recording/reproducing apparatus 20 of the invention, can be made of any material that serves to record volume-type holograms. Various materials are known as materials of hologram recording media. Among them are: organic materials such as photopolymer, photo-refractive crystals such as lithium niobate, and materials having various physical mechanism, such as silver salt film and bacteriorhodopsin, and photochemical hole-burning materials. The hologram recording/reproducing apparatus 20 according to the invention can reliably record and reproduce holograms on and from a hologram recording medium made of any of these materials.

As described above, the recording/reproducing apparatus 20 of the present invention records and reproduce Fourier holograms. Nonetheless, the apparatus 20 can be re-designed to record and reproduce other kinds of holograms, such as Fresnel holograms, image holograms.

The recording/reproducing apparatus 20 according to this invention can achieve multiplex recording by means of, for example, angle multiplexing. That is, the apparatus 20 can record a plurality of holograms on one hologram recording medium 1. To record two or more holograms on the hologram recording medium 1 by means of angle multiplexing, it suffices to change the incidence angles of the first and second reference beams to the hologram recording medium 1 every time a hologram is recorded on the medium 1. Thus, in order to record holograms by means of angle multiplexing in the recording/reproducing apparatus 20, it is only necessary to arrange a angle-deflecting means on the path of the first and second reference beams. The angle-deflecting means is, for example, an acoustic optical deflector (AOD), an electro-optical deflector (EOD), a galvano mirror or the like.

The hologram recording/reproducing apparatus 20 of this invention can also reproduce the holograms recorded on the hologram recording medium 1 by means of, for example, angle multiplexing.

To reproduce the holograms recorded on the hologram recording medium 1 by angle multiplexing by means of the hologram recording/reproducing apparatus 20, it is necessary to control at the same time the incidence angle of the first reading beam to the medium 1 and the incidence angle of the second reading beam to the medium 1. To control these incidence angles at the same time, it suffices to arrange the angle-deflecting means between the light source 21 and the first beam splitter 22. The angle-deflecting means changes the direction in which the laser beam propagates before the first beam splitter 22 branches the light path. The laser actually employed generates a Gaussian beam, and the hologram recording medium 1 is positioned so that its center lies at the waist of the Gaussian beam. The first and second reading beams can therefore deflected by the same angle as the laser beam, by means of the angle-deflecting means. As a result, both reading beams can be applied to the hologram recording medium 1 at the same angle of incidence.

It is desired that the fist and second beam splitters 22 and 23 have such transmittances or reflectances that the ratio of the amounts of the laser beams passing through or reflected by the beam splitters 22 and 23 becomes appropriate in the hologram recording medium 1.

An AOD using a share wave may be used as the angle-deflecting means. If so, a 0-th degree beam can be used as the object beam. In this case, the incidence angle of the object beam to the spatial light modulator 24 can be fixed at a particular value, making it possible to enhance the use efficiency of the object beam.

In the embodiment described above, a plurality of holograms are recorded by means of angle multiplexing and reproduced, when necessary. Nevertheless, the hologram recording/reproducing apparatus 20 according to this invention can record holograms by means of other multiplexing methods such as wavelength multiplexing, phase-code multiplexing, shift multiplexing, peristrophic multiplexing, or any possible combination of these, and can reproduce the holograms thus recorded.

A hologram recorded on the photo-refractive crystal may be destroyed when the crystal is exposed to light to reproduce the hologram. To prevent destruction of the hologram, it has been proposed that two waves of different lengths be used to record a hologram. This method proves effective (see U.S. Pat. No. 5,665,493 to Bai et al., Y. S. Bai and R. Kachru, Phys. Rev. Lett, 78, 2944, 1997, D. Lande et al. 22, 1722, 1997, Jap. Pat. Appln. KOKAI Publications Nos. 10-45497 and 10-45498.) In this method, crystals such as Pr: $LiNbO_3$ and Pr: $LiTaO_3$ are used as recording media, and a two-step process is utilized to record a hologram. In the two-step process, the electrons at a low level are first excited to an intermediate level with blue light having a wavelength of about 450 nm. Then, infrared rays having a wavelength of about 850 nm are applied, thereby recording the hologram. In the hologram recording/reproducing apparatus 20 of this invention, too, the hologram recording medium 1 may be one made of crystal such as Pr: $LiNbO_3$ or Pr: $LiTaO_3$, and the light source 21 may emits two laser beams having different wavelengths. The method can then be easily performed also in the hologram recording/reproducing apparatus 20.

Figure 13:
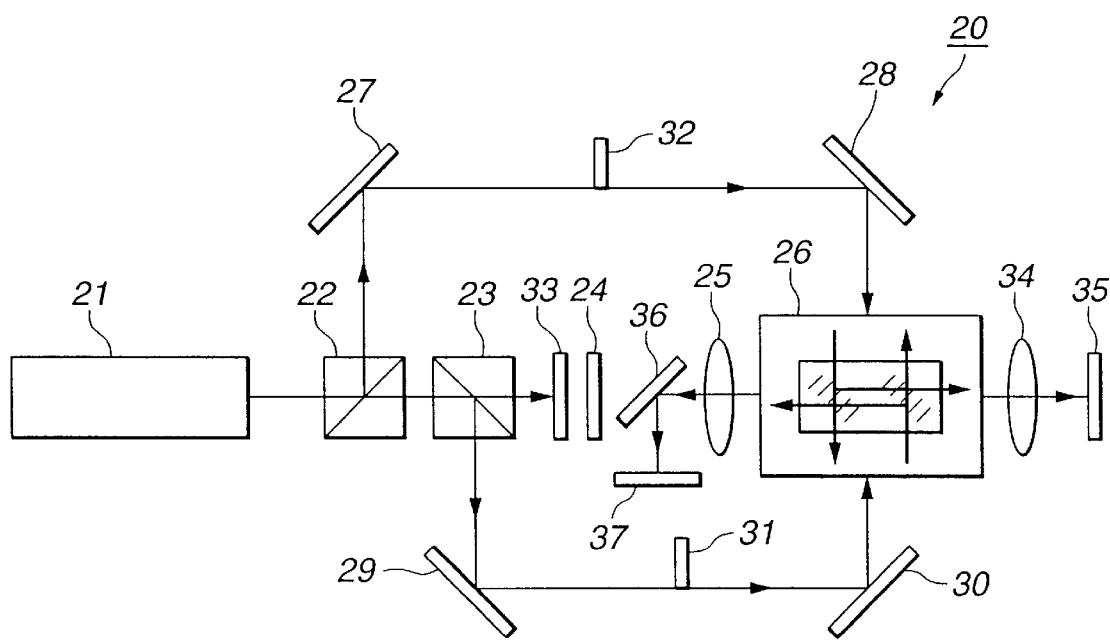
FIG. 13 is a diagram illustrates how the hologram recording/reproducing apparatus reproduces a hologram from a hologram recording medium.

In the apparatus 20 shown in FIG. 13, the second reading beam may be phase-conjugate to the first reading beam. If this is the case, the first and second reading beams will have wave fronts that are perfectly conjugate. Various means are available for generating phase-conjugate light beams. Representative examples of these means are a means for mixing four light waves and a self-exciting, phase conjugate mirror.

First, a hologram recording/reproducing apparatus 40 designed to generate phase-conjugate light beams by mixing four light waves will be described, with reference to FIG. 14.

Figure 14:
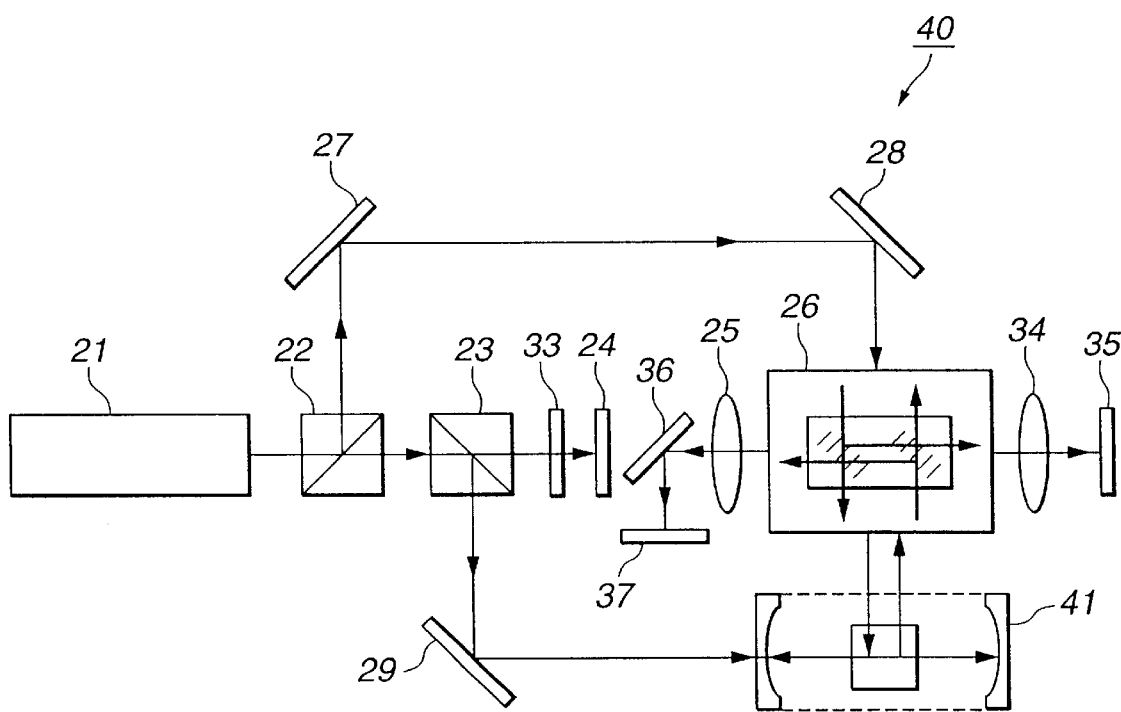
FIG. 14 is a diagram illustrating another hologram recording/reproducing apparatus according to the present invention.

The hologram recording/reproducing apparatus 40 shown in FIG. 14 is identical in basic structure to the hologram recording/reproducing apparatus 20 shown in FIGS. 12 and 13. It is characterized in that a phase-conjugate mirror 41 is used in place of the mirror 30 used in the hologram recording/reproducing apparatus 20. A hologram is recorded on the hologram recording medium 1 held by the medium holding means 26 in hologram recording/reproducing apparatus 40, just in the same way as in the hologram recording/reproducing apparatus 20 shown in FIGS. 12 and 13. Therefore, how a hologram is recorded will not be explained.

The hologram recorded on the hologram recording medium 1 is reproduced in the following way by means of this hologram recording/reproducing apparatus 40. The light beam 21 emits a laser beam, which is reflected by the first beam splitter 22. The laser beam, thus reflected, is reflected first by the mirror 27 and then by the mirror 28. The laser beam is applied as the first reading beam to the hologram recording medium 1 held by the medium holding means 26. The first reading beam passes through the medium 1 and applied to the phase-conjugate mirror 41 that is arranged on the path of the first reading beam.

In the meantime, the laser beam emitted from the light source 21 is reflected by the second beam splitter 23. This laser beam is reflected by the mirror 29 and is applied as a pump beam into the phase-conjugate mirror 41 that is arranged on the path of the pump beam. In the phase-conjugate mirror 41, the laser beam propagates at right angles to the first reading beam applied into the phase-conjugate mirror 41.

The laser beam reflected by the mirror 29 is applied, as the pump beam, into the phase-conjugate mirror 41. When the first reading beam enters the phase-conjugate mirror 41 after passing through the hologram recording medium 1, four light waves are mixed in the phase-conjugate mirror 41. As a result of this, a light beam that is phase-conjugate to the first reading beam is generated. This light beam is applied as the second reading beam to the hologram recording medium 1.

When the first reading beam and second reading beam are applied to the hologram recording medium 1, the first hologram 2 is reproduced from the first reading beam and the first reproduced beam is generated, as in the hologram recording/reproducing apparatus 20 shown in FIGS. 12 and 13. Similarly, the second hologram 3 is reproduced from the second reading beam and the second reproduced beam is generated, as in the hologram recording/reproducing apparatus 20.

The first reproduced beam and the second reading beam interfere with each other, whereby a new hologram identical to the second hologram 3 is recorded and superposed on the second hologram 3. The second reproduced beam and the first reading beam interfere with each other, whereby a new hologram identical to the first hologram 2 is recorded and superposed on the first hologram 2. The first reproduced beam emitted from that portion of the medium 1 from which the object beam is emitted. The first reproduced beam is Fourier-transformed by the Fourier transform lens 34 and applied to the imaging device 35 such as a CCD. Meanwhile, the second reproduced beam emitted from that portion of the medium 1 to which the object beam is applied. The second reproduced beam is Fourier-transformed by the Fourier transform lens 25, then reflected by the mirror 36 and finally applied to the imaging device 37 such as a CCD.

A beam conjugate in phase to the first reading beam may be generated by mixing four light waves and applied as the second reading beam to a hologram recording medium, as in the present embodiment. In this case, the components of a hologram recording/reproducing apparatus need not be aligned with high precision. Therefore, a hologram recording/reproducing can be easily provided according to the present invention.

Now, a hologram recording/reproducing apparatus 50 designed to generate phase-conjugate light beams by using a self-exciting, phase conjugate mirror will be described, with reference to FIG. 15

Figure 15:
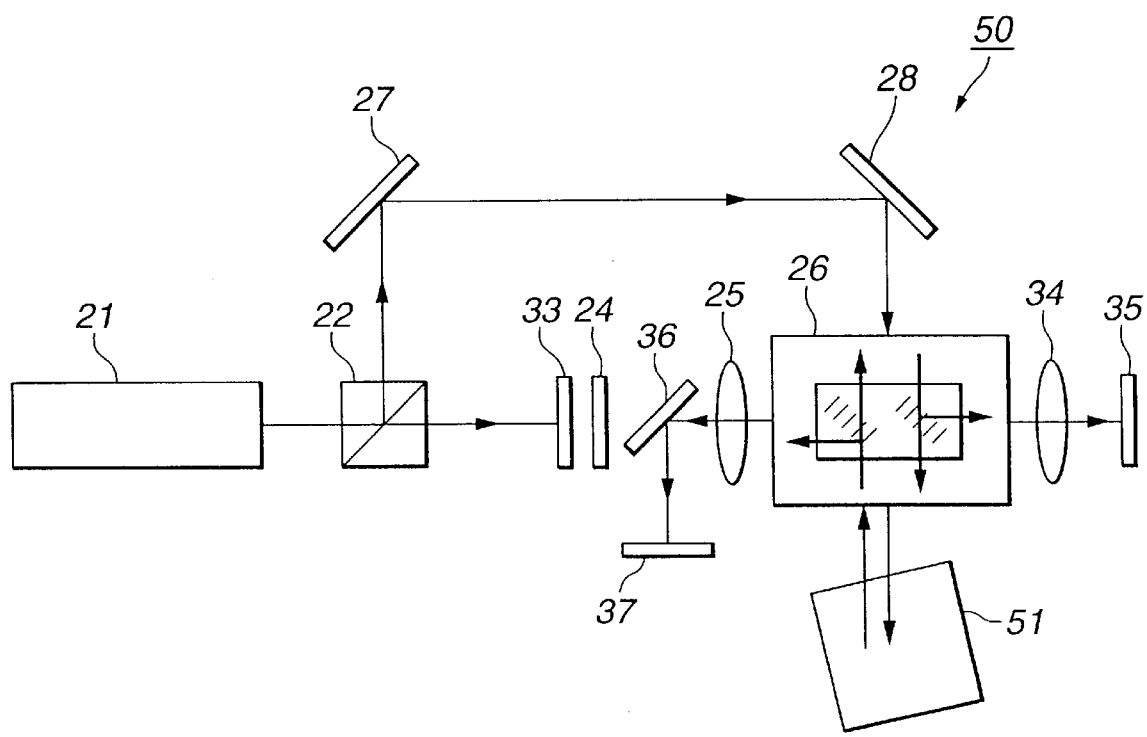
FIG. 15 is a diagram showing still another hologram recording/reproducing apparatus according to this invention.

The hologram recording/reproducing apparatus 50 shown in FIG. 15 has the same basic structure as the hologram recording/reproducing apparatus 20 shown in FIGS. 12 and 13. It is characterized in that the second beam splitter 23 and the mirror 29 are not used and that a self-exciting, phase conjugate mirror 51 is used in place of the mirror 30. The apparatus 50 records a hologram is recorded on the hologram recording medium 1 held by the medium holding means 26, just in the same way as in the hologram recording/reproducing apparatus 20 shown in FIGS. 12 and 13. Therefore, how a hologram is recorded will not be explained.

The hologram recorded on the hologram recording medium 1 is reproduced in the following way by means of this hologram recording/reproducing apparatus 50. The light beam 21 emits a laser beam, which is reflected by the first beam splitter 22. The laser beam, thus reflected, is reflected first by the mirror 27 and then by the mirror 28. The laser beam is applied as the first reading beam to the hologram recording medium 1 held by the medium holding means 26. The first reading beam passes through the medium 1 and is applied to the self-exciting, phase conjugate mirror 51 that is arranged on the path of the first reading beam.

The self-exciting, phase conjugate mirror 51 generates a beam that is phase-conjugate to the beam applied to it. When the first reading beam is applied into the mirror 51, the mirror 51 generates a beam that is conjugate in phase to the first reading beam. The beam, which has been generated by the phase conjugate mirror 51 and which is phase-conjugate to the first reading beam, is applied as the second reading beam to the hologram recording medium 1.

When the first reading beam and second reading beam are applied to the hologram recording medium 1, the first hologram 2 is reproduced from the first reading beam and the first reproduced beam is generated, as in the hologram recording/reproducing apparatus 20 shown in FIGS. 12 and 13. Similarly, the second hologram 3 is reproduced from the second reading beam and the second reproduced beam is generated, as in the hologram recording/reproducing apparatus 20.

The first reproduced beam and the second reading beam interfere with each other, whereby a new hologram identical to the second hologram 3 is recorded and superposed on the second hologram 3. Further, the second reproduced beam and the first reading beam interfere with each other, whereby a new hologram identical to the first hologram 2 is recorded and superposed on the first hologram 2. The first reproduced beam emitted from that portion of the medium 1 from which the object beam is emitted. The first reproduced beam is Fourier-transformed by the Fourier transform lens 34 and applied to the imaging device 35 such as a CCD. Meanwhile, the second reproduced beam emitted from that portion of the medium 1 to which the object beam is applied. The second reproduced beam is Fourier-transformed by the Fourier transform lens 25, then reflected by the mirror 36 and finally applied to the imaging device 37 such as a CCD.

A beam conjugate in phase to the first reading beam may be generated by the self-exciting, phase conjugate mirror 51 and applied as the second reading beam to the hologram recording medium 1, as in the present embodiment. In this case, the components of a hologram recording/reproducing apparatus need not be aligned with high precision. Therefore, a hologram recording/reproducing can be easily provided according to the present invention. The apparatus thus provided can be simple in structure.

What is claimed is:

1. A hologram recording/reproducing method comprising the steps of:
    providing a first hologram recording medium on which a first hologram has been recorded by interference between an object beam and a reference beam;
    simultaneously applying a first beam that is identical to the reference beam and a second beam that is conjugate to the reference beam, as reading beams, to the first hologram recording medium;
    forming a second hologram by a third beam that results from the interference between the first beam and the second beam;
    forming a third hologram by a fourth beam that results from the interference between the first beam and the second beam; and
    recording the second and third holograms on the first hologram recording medium so that one of the second hologram and the third hologram is superposed on the other of the second hologram and the third hologram as a fourth hologram, thereby reproducing the first hologram.

2. The hologram recording/reproducing method according to claim 1, wherein the reference beam has at least two parts that are spatially separated from each other, the method further comprising:
    simultaneously applying as reading beams a fifth beam that is identical to one of the parts of the reference beam from the first hologram and a sixth beam that is conjugate to the other part of the reference beam from the first hologram to the first hologram recording medium.

3. The hologram recording/reproducing method according to claim 2,
    wherein the fourth hologram is recorded on at least a second hologram recording media and a third hologram recording media,
    wherein a fifth hologram formed by the interference between the fifth and sixth beams is superposed on at least one of the second hologram recording media and the third hologram recording media, and
    wherein a sixth hologram formed by the interference between the fifth and sixth beams is superposed on the other of the second hologram recording media and the third hologram recording media.

4. The hologram recording/reproducing method according to claim 1, wherein recording the second and third holograms on the first hologram recording medium includes multiplexing.

5. A hologram recording/reproducing apparatus comprising:
    a recording medium holding section configured to hold a first hologram recording medium on which a first hologram has been recorded by interference between an object beam and a reference beam; and
    a hologram recording/reproducing section having
    means for simultaneously applying a first beam that is identical to the reference beam and a second beam that is conjugate to the reference beam, as reading beams, to the first hologram recording medium,
    means for forming a second hologram from a third beam that results from the interference between the first beam and the second beam,
    means for forming a third hologram from a fourth beam that results from the interference between the first beam and the second beam, and
    means for recording the second and third holograms on the first hologram recording medium so that one of the second hologram and the third hologram is superposed on the other of the second hologram and the third hologram as a fourth hologram, thereby reproducing the first hologram.

6. The hologram recording/reproducing apparatus according to claim 5,
    wherein the recording medium holding section comprises a hologram recording medium and
    wherein the reference beam comprises at least two parts spatially separated from each other.

7. The hologram recording/reproducing apparatus according to claim 6,
    wherein the recording medium holding section comprises at least two hologram recording media, on each of which a hologram has been recorded, and
    wherein the hologram recording/reproducing section
    is configured to superpose on at least one of the two hologram recording media a fifth hologram formed by the interference between the first and second beams, and
    is configured to superpose on the other of said at least two recording media a sixth hologram formed by the interference between the first and second beams.

8. The hologram recording/reproducing apparatus according to claim 5, wherein the hologram recording/reproducing section is configured to reproduce any holograms recorded on the first hologram recording medium by multiplexing.

9. The hologram recording/reproducing apparatus according to claim 5, wherein the hologram recording/reproducing section comprises a light source, light path branching means for branching a light beam emitted from the light source, a first optical system for applying one of beams branched by the light path branching means, as the beam identical to the reference beam, to the hologram recording medium held by the recording medium holding section, and a second optical system for applying the other of the beams branched by the light path branching means, as the beam conjugate to the reference beam, to the hologram recording medium held by the recording medium holding section.

10. The hologram recording/reproducing apparatus according to claim 5, wherein the hologram recording/reproducing section comprises a light source, an optical system for applying a beam emitted from the light source, as the beam identical to the reference beam, to the hologram recording medium held by the recording medium holding section, and phase-conjugate beam generating means for generating, from the beam identical to the reference beam, a beam that is phase-conjugate to the reference beam.

* * * * *